United States Patent [19]

Williamson et al.

[11] Patent Number: 5,127,265
[45] Date of Patent: Jul. 7, 1992

[54] FLAME RESISTANT PITOT PROBE COVER

[75] Inventors: Mickey A. Williamson, Seattle, Wash.; Sue Faircloth, Raleigh Wake, N.C.

[73] Assignee: The Boeing Company, Seattle, Wash.

[21] Appl. No.: 613,597

[22] Filed: Nov. 15, 1990

[51] Int. Cl.⁵ .......................... G01C 21/00; G01F 1/46
[52] U.S. Cl. .................................. 73/182; 73/861.65; 150/154; 244/1 R
[58] Field of Search ................ 73/182, 861.65, 861.66; 244/1 R, 129.1, 129.4; 150/154, 166; 135/34.2, 33.2

[56] References Cited

U.S. PATENT DOCUMENTS

| | | | |
|---|---|---|---|
| 2,105,172 | 1/1938 | Voelker | 135/34.2 |
| 2,365,268 | 12/1944 | Herter, Jr. | 150/154 X |
| 2,532,316 | 8/1948 | Larkin | 150/154 |
| 2,655,106 | 6/1948 | O'Brien | 102/200 |
| 2,700,905 | 2/1947 | Urquhart | 138/2 |
| 2,904,611 | 12/1955 | Duddy | 138/2 |
| 4,158,407 | 6/1979 | Rest | 150/154 |
| 4,514,995 | 5/1985 | Curtis et al. | 150/154 |
| 5,026,001 | 6/1991 | Wright et al. | 73/861.65 |

*Primary Examiner*—Donald O. Woodiel
*Attorney, Agent, or Firm*—Elizabeth F. Harasek; B. A. Donahue

[57] ABSTRACT

A flame and heat-resistant cover for airplane pitot tubes comprises a woven tube of fire-resistant fibers. The front of the tube is gathered and it is sown with a fire-resistant, non-abrasive thread.

3 Claims, 1 Drawing Sheet

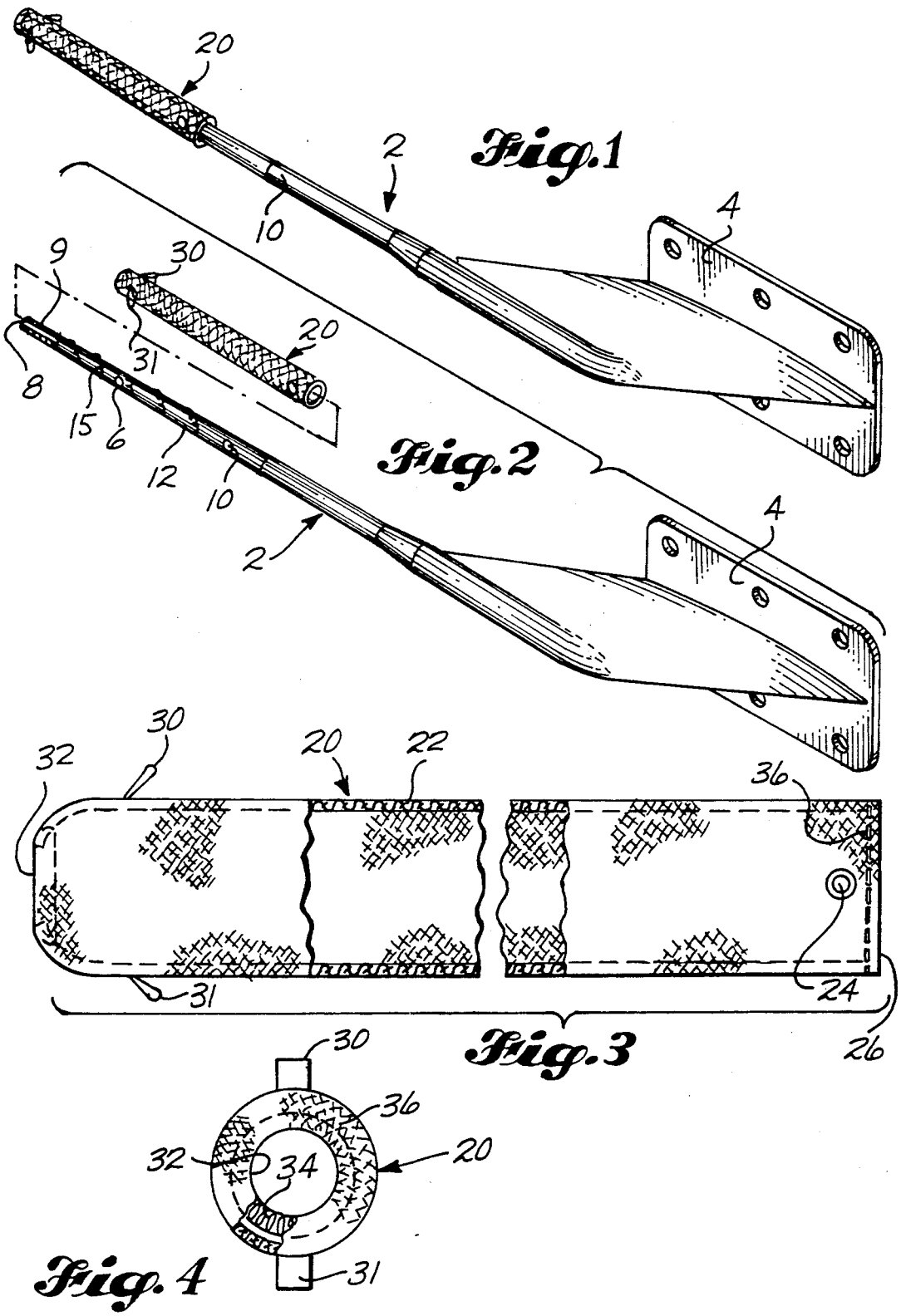

FLAME RESISTANT PITOT PROBE COVER

This invention relates to improved covers for pitot static probes.

BACKGROUND

Because pitot static probes for measuring aircraft speed and altitude are delicate instruments, they are generally covered before installation. Moreover, when an aircraft is on the ground for an appreciable time, pitot covers are temporarily installed to prevent introduction of foreign matter into the probes. Pitot covers must be removed before flight for the pitot-static system to operate properly.

Commercial aircraft are generally provided with means to heat pitot static probes to prevent ice formation inside the pitot tube or at the static ports. There have been occasions when covers have inadvertently been left in place and pitot heat has been applied. Before this invention, considerable damage could be done to the pitot tube by the melting or burning of the cover material.

A number of different approaches were taken to solve this problem. A ceramic material was formed to cover the pitot tube probe tip, the static ports, and the aft region of the tube with openings between these three areas for heat dissipation. The ceramic material was supported with a steel frame. After about three hours of pitot heater operation, the ceramic material darkened over most of the visible regions. The ceramic material also began to fray and left fiber-like residue on the pitot probe when the cover was removed. This lead to concern that dirt or contamination could be trapped between the cover and the pitot tube. There were further concerns about moisture or dirt being introduced into the pitot tube if the cover should become dirty.

Another pitot cover was designed using gray E-glass material with an aluminum outer shell in a sock-style configuration. The material was soft enough to properly protect the probe, but the aluminum shell caused an oven effect in still-air operation and the pitot probe became too hot. The cover also left a gray residue, and the aluminum outer shell became very embrittled when exposed to pitot heat.

Another sock-style cover was made from E-glass with a stainless steel wire intermesh. After heater operation with the cover installed, the cover turned mostly brown and the temperature of the pitot probe rose unsatisfactorily. The steel wire intermesh was considered unacceptable because it scratched the nickel plating on the pitot tube.

Accordingly, an improved pitot cover was invented in accordance with this invention.

FIG. 1 is a perspective view of a typical pitot-static probe for a commercial aircraft with a pitot cover in accordance with the invention in place.

FIG. 2 is a perspective view of a braided fiberglass pitot tube cover in accordance with the invention next to an uncovered pitostatic probe.

FIG. 3 is an enlarged side view of a pitot cover of the type shown in FIGS. 1 and 2.

FIG. 4 is a view taken along 4—4 of FIG. 3, partly in section.

DETAILED DESCRIPTION

FIGS. 1 and 2 show a typical pitot-static probe 2 of the type used on commercial aircraft. Base 4 of probe 2 is fastened to an aircraft with screws (not shown). Probe 2 is connected to the pitot-static monitoring system (not shown) and power supplies for the pitot tube heater(s) (not shown). Probe 2 is mounted so that pitot pressure port 8 at end 9 of pitot tube 10 faces forward. Main static port 6 and auxiliary static port 12 are located approximately mid-way down tube 10.

Pitot-static instruments work on the principle of comparing the ram or pitot pressure at the ram port 8 to the static pressure at static port 6 or 12. Such parameters as air speed and altitude are calculated based on the measured pressure differential. Electrical resistance heaters 15 inside tube 10 are turned on as environmental factors indicate to prevent icing at pressure port 8 or static ports 6 and 12. FIG. 1 shows a pitot cover 20 covering pitot probe 2.

FIGS. 3 and 4 show a pitot cover tube 20. Cover 20 comprises a braided fiberglass filament 22 which has been preheated to remove any sizing or finishing coatings which could discolor in the presence of heat. Grommet 24 is provided at bottom end 26 of the cover 20 for attachment of a warning streamer. Loops 30 and 31 are provided near mouth 32 of cover 20 to assist in installation. Mouth 32 is gathered with respect to the rest of woven cover 22 to protect ram port 8 of pitot tube 10 when installed by means of spring 34 with a suitable tension to facilitate proper fit. Cover 20 is sewn with a nonabrasive heat resistant thread 36.

EXAMPLE

A pitot cover was made from braided E-type fiberglass. The glass braid was pre-annealed to remove any sizing or organic processing residues. The glass fibers were braided into a tube with an inside diameter of approximately 1½ inches. The braided cover had a thickness of about 0.003 inch, the weave had 144 carriers, and 150-3-3 yarn was used. No more than about 20 picks per square inch, expanded, were allowed to make sure that no fiberglass was inadvertently introduced into the pitot tube or static ports.

Installation loops were installed near the gathered mouth end of the pitot cover which were approximately 7/16 of an inch long and 1/16 of an inch in diameter. They were also made of fiberglass braid. The sock was sewn together with fiberglass thread, and a two-part brass grommet was installed on the open end of the cover for a warning streamer. The mouth opening of the cover was contracted using an SS17-7 stainless steel spring which regulated the opening size between ⅞ and 1 inch.

This was found to be the softest and most pliable of various pitot covers that were tried to solve the melting and burning problems of conventional pitot covers. The temperature of the pitot tube increased about 60° F. and 96° F., respectively, for the pitot ram tip and static ports after application of pitot heat for about 30 minutes with respect to the temperature of an uncovered pitot tube heated for the same period of time. This temperature rise was acceptable and lower than that of other designs. The appearance of the cover after testing was excellent and the overall performance was considered to be far superior to any other pitot cover that we know about.

While our invention has been described in terms of specific embodiments thereof, other forms may be readily adapted by one skilled in the art. Accordingly, the scope of the subject invention is to be limited only in accordance with the following claims.

We claim:

1. A flame and heat resistant cover for a pitot-static probe, said cover having an open end for easy placement over a said probe and a gathered end for covering the ram port of a said probe, said cover consisting essentially of a braided tube of glass fiber threads, said tube having been heated prior to placement on a said probe to remove any sizing or organic residue from said glass fiber; a pocket at the gathered end of said cover formed by folding over an end of said tube and sewing it with fiberglass thread; and a metal spring located within said pocket whereby the opening size at the gathered end of said cover may be adjusted.

2. The cover of claim 1 wherein the tube is comprised of E-type fiberglass.

3. The cover of claim 1 having a thickness of about 0.003 inches.

* * * * *